United States Patent [19]

Housholder

[11] 4,247,508
[45] Jan. 27, 1981

[54] MOLDING PROCESS

[75] Inventor: Ross F. Housholder, Arlington, Tex.

[73] Assignee: Hico Western Products Co., Mesa, Ariz.

[21] Appl. No.: 99,333

[22] Filed: Dec. 3, 1979

[51] Int. Cl.³ .............................................. B29C 1/02
[52] U.S. Cl. ................................... 264/219; 264/122;
264/221; 264/308; 264/317
[58] Field of Search ............... 264/122, 219, 221, 308, 264/317

[56] References Cited
U.S. PATENT DOCUMENTS

| | | | |
|---|---|---|---|
| 1,902,627 | 3/1933 | Elbogen | 264/225 |
| 3,274,668 | 9/1966 | Horst | 264/122 |
| 3,290,421 | 12/1966 | Miller | 264/219 |
| 3,484,514 | 12/1969 | Longinotti | 264/308 |
| 3,695,573 | 10/1972 | Huffaker et al. | 264/219 |
| 4,088,723 | 5/1978 | Norton | 264/221 |

Primary Examiner—Donald J. Arnold
Assistant Examiner—W. Thompson
Attorney, Agent, or Firm—Arthur F. Zobal

[57] ABSTRACT

A molding process for forming a three-dimensional article in layers. In one embodiment, a matrix comprising a planar grid-like member having a plurality of openings formed therethrough is employed. In an initial layer, casting material and mold material are deposited in selected openings to form a portion of the article in that layer with the casting material surrounded by the mold material. The matrix is located sequentially in adjacent layers and in each layer, the selective deposition of casting and mold material is repeated whereby the article is formed layer by layer from the casting material held in place by the mold material. The casting material is solidified and the mold material is removed.

In another embodiment, planar layers of material are sequentially deposited. In each layer, prior to the deposition of the next layer, a portion of its area is solidified to define that portion of the article in that layer. Selective solidification of each layer may be accomplished by using heat and a selected mask or by using a controlled heat scanning process.

3 Claims, 17 Drawing Figures

MOLDING PROCESS

FIELD OF THE INVENTION

This invention relates to a molding process for forming a three-dimensional article in layers.

SUMMARY OF THE INVENTION

It is an object of the present invention to provide a new and unique molding process for forming three-dimensional articles in layers.

It is a further object of the present invention to provide a new and unique molding process for forming three-dimensional articles in layers and which process may be controlled by modern technology such as computers or electronic systems.

In one embodiment, a casting material and a mold material are deposited in unsolidified form sequentially in planar layers. In a first layer, the casting material is deposited to fill an area which defines that portion of the article to be formed in that layer. In the first layer, the mold material is deposited next to said area such that the mold material holds the casting material in place. These steps are repeated for each layer until the article is formed from the casting material in unsolidified form held in place by the mold material. The casting material is solidified and the mold material removed.

In a further aspect, a matrix comprising a planar grid-like member having a plurality of openings formed therethrough is employed for carrying out the process. In each layer, the casting material and mold material are deposited in selected openings of the matrix to form the article in layers.

In another embodiment, planar layers of material are sequentially deposited. In each layer, prior to the deposition of the next layer, a portion of its area is solidified to define that portion of the article in that layer whereby the article is formed layer by layer. The unsolidifed material is removed to obtain the desired article. Selective solidification of each layer may be accomplished by using heat and a selected mask or by using a controlled heat scanning process.

DESCRIPTION OF THE PREFERRED EMBODIMENTS

Referring now to FIGS. 1-13, the process of the one embodiment of the present invention for forming a three-dimensional article now will be described. In carrying out the process, the article is formed of ceramic material. A casting material and a mold material are employed in forming the article. The casting material is a dry mixture of plaster of paris and sand and the mold material is dry sand. The size of the sand grains may be very small whereby the sand is in powder form. The article is constructed by depositing the casting material and mold material in layers using a two-dimensional matrix 21 and a container 23. The container 23 has a lower end closed by a base 25 and an opening 27 at its upper end.

Figure 1:
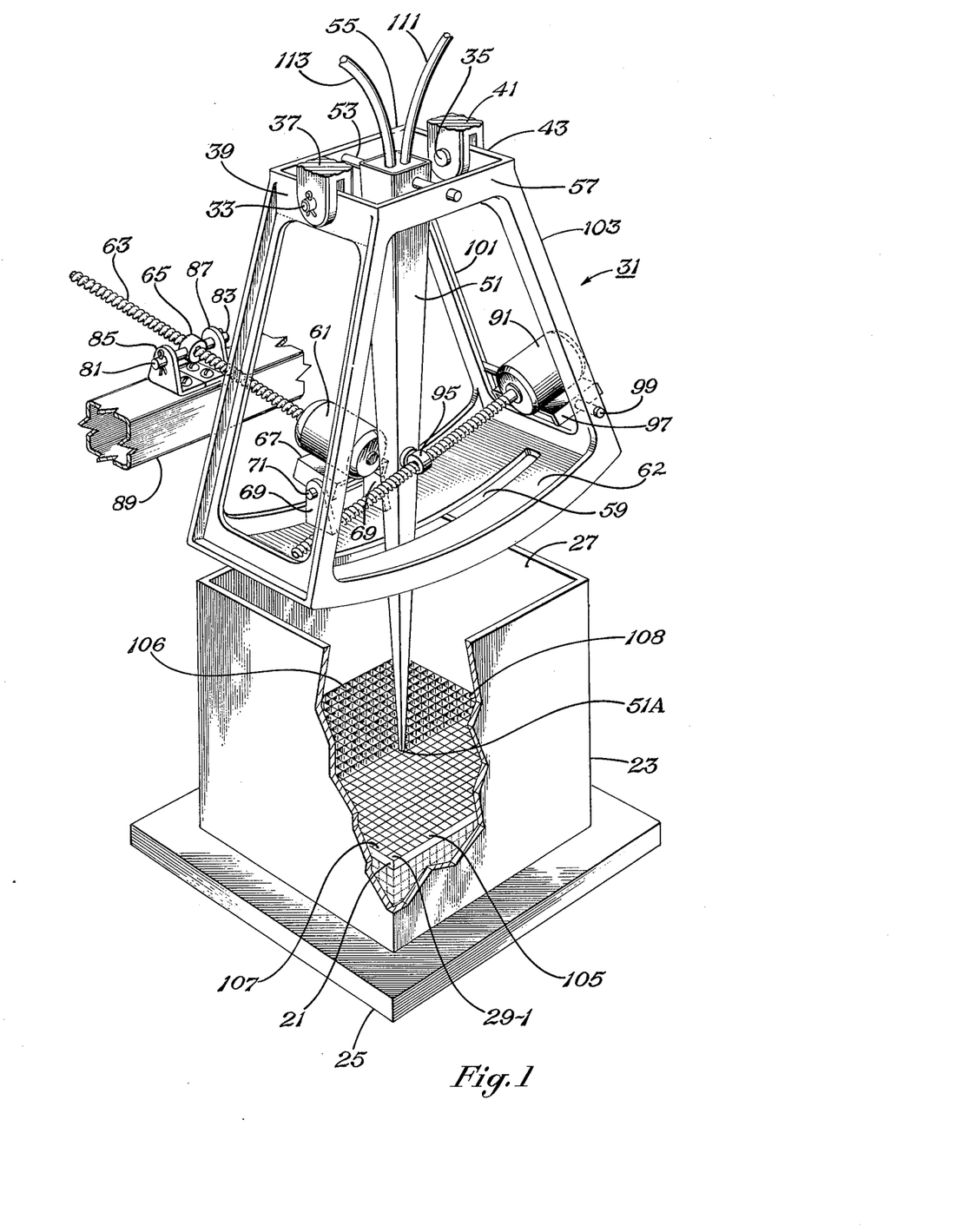
FIG. 1 illustrates an apparatus for carrying out the process of one embodiment of the present invention.
Figure 2:
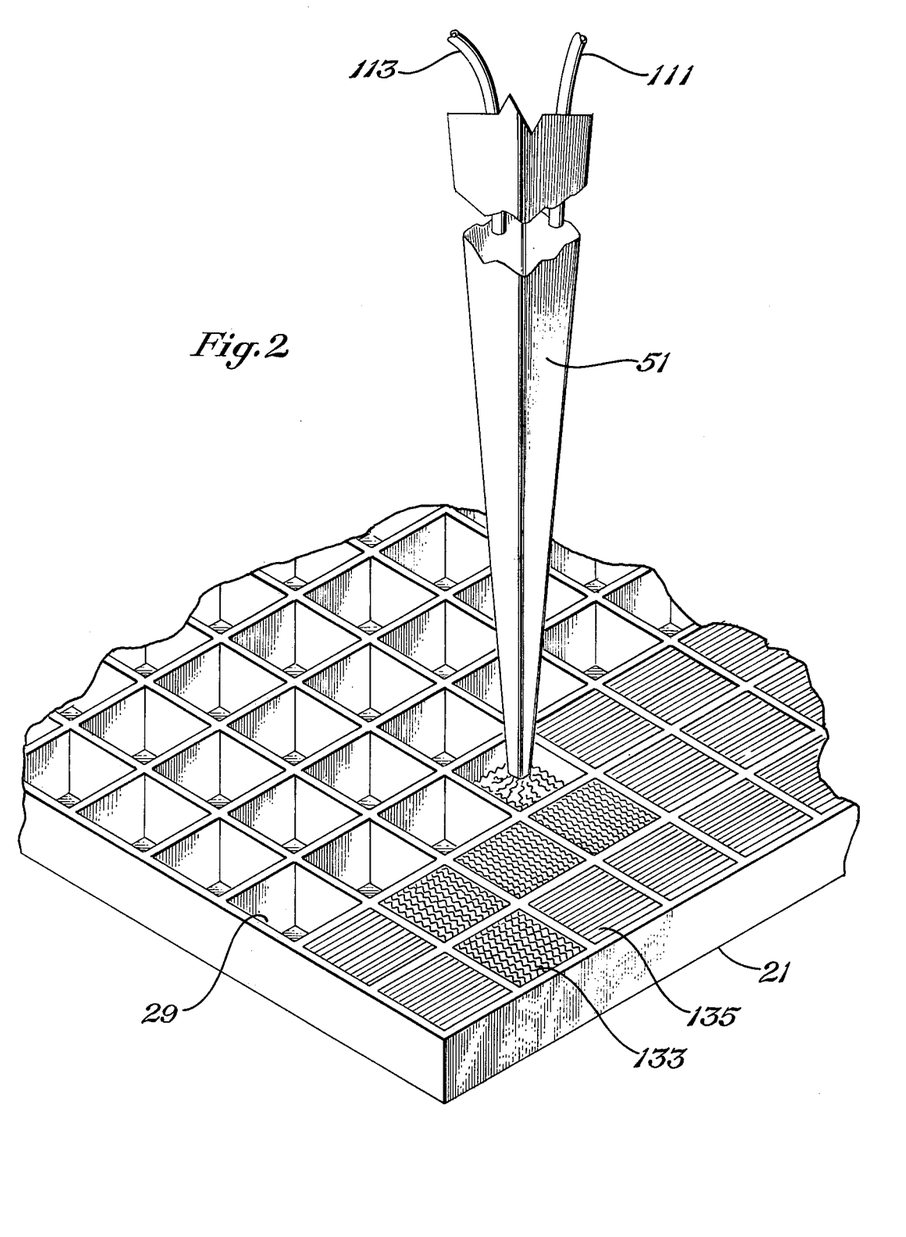
FIG. 2 is an enlarged view of the delivery mechanism and matrix of FIG. 1.

The matrix 21 comprises a planar grid-like member having a plurality of openings 29 formed therethrough in rows and columns. The exterior of the matrix is rectangular in shape having dimensions slightly less than the interior dimensions of the container 23 whereby the matrix will fit tightly but slidingly within the walls of the container 23. Although not shown, a mechanism will be employed to move the base 25 and hence container 23 upward and downward vertically (along a Z axis) while the matrix 21 is located in a stationary position. The device for holding the matrix 21 in a stationary position is not shown, however it may comprise a plurality of thin rods having their lower ends attached to the outer walls of the matrix and extending upward next to the inner walls of the container. The upper ends of the rods may be attached to stationary supports (not shown) located at a level above the maximum height attainable by the upper edges of the walls of the container.

Located above the container 23 is a frame 31 supported to pivot about an X axis perpendicular to the Z axis. The X axis is defined by pins 33 and 35. Pin 33 extends through the arms of stationary yoke 37 and through the upper frame member 39. Pin 35 extends through the arms of stationary yoke 41 and through upper frame member 43. A funnel 51 is supported by the frame 31 for pivotal movement about the Y axis perpendicular to the X and Z axes. The Y axis is defined by pin 53. This pin extends through the top of the funnel 51 and through upper frame members 55 and 57. The lower end of the funnel 51 extends through slot 59 formed through the lower wall 62 of the frame 31 to a level just above the upper portion of the matrix 21. The walls of the slot 59 act to guide the funnel as it pivots about pin 53.

A small electric reversible motor 61 for rotating a threaded member 63 within a nut 65 is employed for pivoting the frame 31 above the X axis. The motor 61 is attached to a support 67 which is pivotally mounted to the lower wall 62 of frame 31 by way of arms 69 and a pin 71. The arms 69 are fixedly secured to the lower wall 62 and the pin 71 extends through the arms 69 and through the support 67. The support 67 and hence the motor 61 may be pivoted about the pin 71. The nut 65 may pivot about pins 81 and 83 which are held by arms 85 and 87. These arms are fixedly secured to a stationary beam 89. When the motor 61 rotates member 63 in one direction, the lower end of the frame 31 is pivoted away from the beam 89 and when the motor 61 rotates member 63 in opposite direction, the lower end of the frame 31 is pivoted toward the beam 89.

A small electrical reversible motor 91 for rotating a threaded member 93 in nut 95 is employed for pivoting the funnel 51 about the Y axis. The motor 91 is attached to a support 97 which is pivotally mounted to the lower portion of frame 31 by way of a pin 99. Pin 99 extends through support 97 and through frame members 101 and 103. The support 97 and hence the motor 91 may pivot about pin 99. The nut 95 is pivotally mounted to one side of the funnel 51 by pin not shown. When the motor 91 rotates member 93 in one direction, the funnel 51 is pivoted away from motor 91 and when the motor 91 rotates member 93 in an opposite direction, the funnel 51 is pivoted toward the motor 91.

The frame 31, funnel 51, motor 61 and its threaded member 63 and motor 91 and its threaded member 93 are constructed such that when the motor 61 is energized in one direction, it can cause frame 31 to pivot to move the lower tip 51A of funnel 51 from the position above the row 105 of openings 29 of the matrix 21 to a position above row 106 of openings 29. When energized in an opposite direction, the motor 61 can cause the frame 31 to pivot to move tip 51A from above row 106 to above row 105. Similarly, when motor 91 is energized in one direction, it can cause the funnel 51 to pivot to move its tip 51A from a position above column 107 of openings 29 of matix 21 to a position above column 108 of openings 29. When energized in an opposite direction, the motor 91 can cause funnel 51 to pivot to move its tip 51A to a position above column 108 to a position above column 107.

The funnel 51 will have a length relative to the dimensions of matrix 21 such that the arc swung by tip 51A in moving between rows 105 and 106 and columns 107, 108 is relatively flat whereby the height of the tip 51A above the matrix 21 in moving between rows 105, 106 and columns 107 and 108 does not vary greatly.

Figure 13:
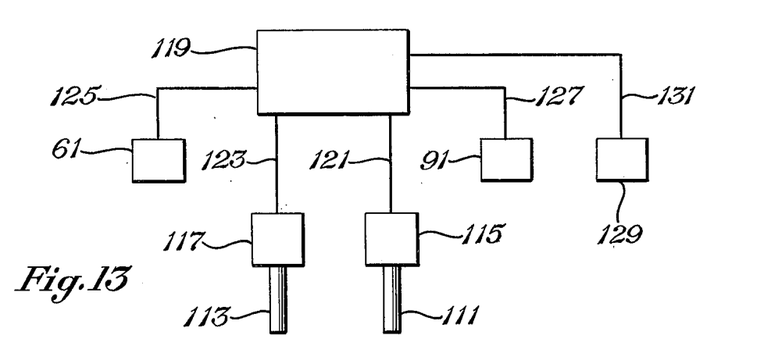
FIG. 13 illustrates a control system for operating the apparatus of FIG. 1.

Extending into the funnel 51 are two flexible conduits 111 and 113. In the funnel 51 conduits 111 and 113 extend to a common lower chamber which is open through the tip 51A. Conduit 111 is employed for injecting a dry mixture of plaster of paris and sand into the funnel and conduit 113 is employed for injecting dry sand only into the funnel. Referring to FIG. 13, conduit 111 is coupled to a source 115 of a dry mixture of plaster of paris and sand and conduit 113 is coupled to a source 117 of dry sand. A system 119 such as a computer controls sources 115 and 117 by way of lines 121 and 123 to selectively inject a dry mixture of plaster of paris and sand or dry sand only into funnel 51 by way of conduits 111 or 113.

The system 119 also selectively controls motors 61 and 91 by way of lines 125 and 127. In addition, it controls a reversible motor 129 by way of line 131 to move the container 23 either up or down. Although not shown, the motor 129 will control a suitable mechanism attached to the bottom of the base 25 for moving the base 25 and hence container 23 either up or down.

Figure 3:
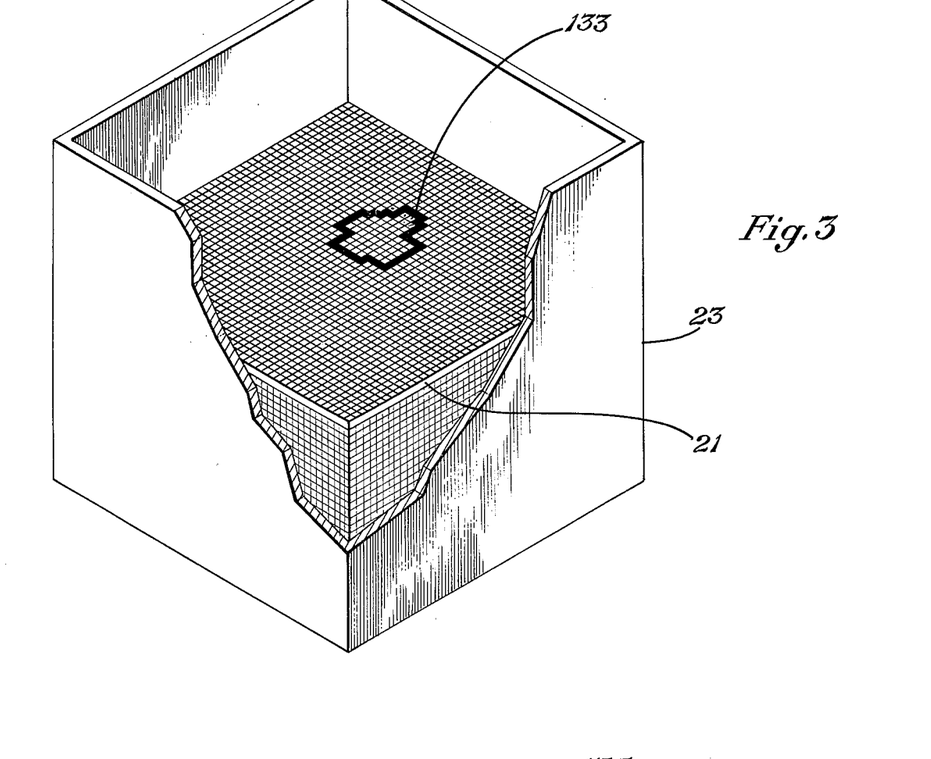
FIG. 3 illustrates a completed layer of article and mold material in a container just before the container is moved downward to position the matrix in the next layer.
Figure 4:
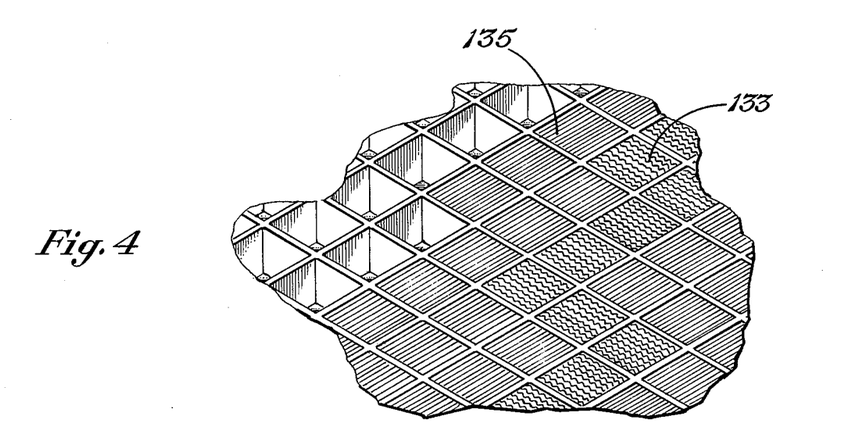
FIG. 4 is an enlarged view of a portion of FIG. 3.
Figure 5:
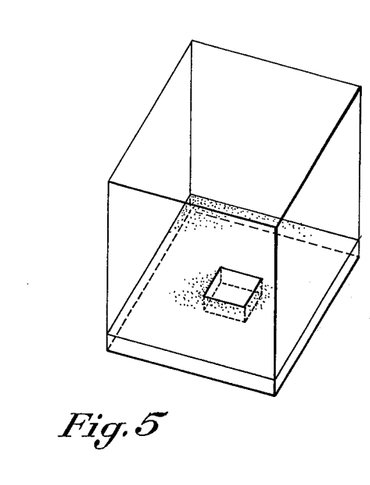
FIGS. 5-12 illustrate the process of forming both the article and mold in layers.
Figure 6:
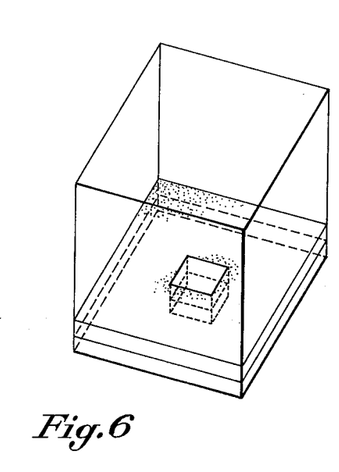
Figure 7:
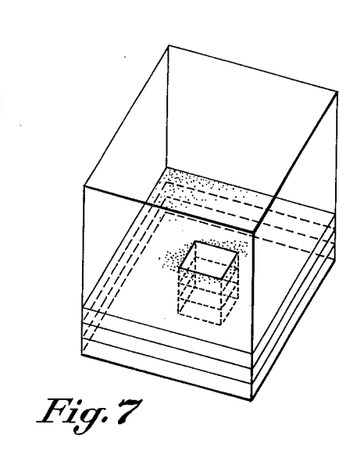
Figure 8:
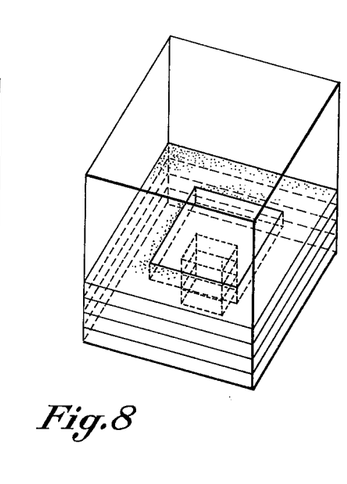

In carrying out the process, initially the container 23 will be located such that the lower end of matrix 21 engages the top of the base 25 within the walls of the container. The computer 119 will operate the system of FIGS. 1 and 13 to fill with casting material those openings 29 of the matrix 21 which define the area of the article in the first layer and to fill with mold material the remaining openings of the matrix. After all of the openings of the matrix are filled, the matrix or container may be vibrated (by means not shown) to settle all of the particles of casting and mold material and also to prevent the powdered material from adhering to the matrix. The container 23 then is moved downward (while matrix is supported at its initial level) a distance corresponding to the thickness of matrix 21 to in effect remove the matrix from the first layer and to place it in the next adjacent layer (second layer from the bottom). Those openings of the matrix which define the area of the article in the second layer then are filled with casting material and the remaining openings filled with mold material. The container 23 then is moved down another layer and the casting and mold material selectively deposited in the openings of the matrix of the next layer. These steps are repeated sequentially for each adjacent layer to form the article layer by layer. As the matrix is removed from each layer, the dry mold material holds the dry casting material in place in the layers. In FIGS. 2-4, casting material is identified at 133 and mold material at 135.

Figure 9:
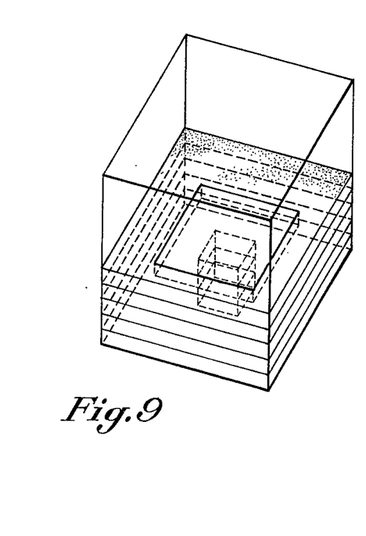
Figure 10:
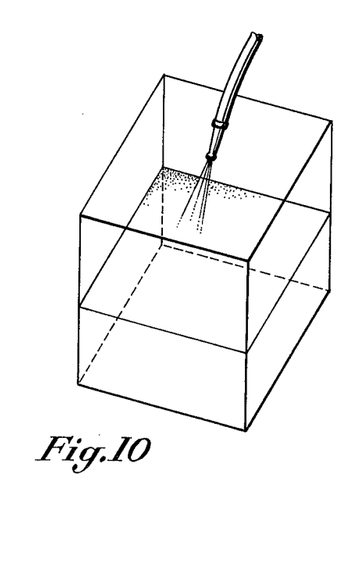
Figure 11:
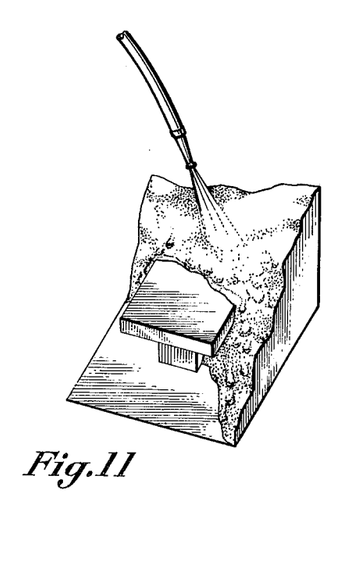
Figure 12:
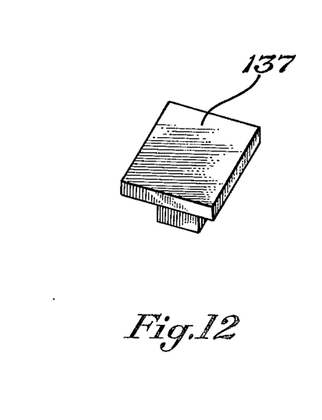

FIGS. 5-9 illustrate the formation of an article and mold in dry form in layers. Although not shown, each of the steps of FIGS. 5-9 are performed in the container 23. In each layer, the casting material which defines that portion of the article in the layer is held in place by the mold material. In FIG. 9, the completed article formed from the dry casting material is shown held in place by the dry mold material. When all of the completed casting-mold layers have been formed, the matrix is removed. Additional mold material then is added to the top to insure that the casting material will not be disturbed and the container vibrated to settle the contents of the container. Water then is carefully added to the container to allow it to slowly flow through the mold material (sand) and the casting material (plaster of paris and sand). This step is illustrated in FIG. 10. In this step, the casting-mold layers will still be in the container although not shown in FIG. 10. Although the water is shown in FIG. 10 added to the top of the casting-mold layers, it is to be understood that suitable openings may be formed through the sides of the container also whereby water may be added into the sides of the casting-mold layers. The casting-mold layers in the container then are allowed to stand for several hours while the water reacts with the plaster of paris. After the plaster of paris has set, the mold material (sand) is washed away with water as shown in FIG. 11 leaving the finished article 137 shown in FIG. 12. Although not shown, the step of FIG. 11 will be carried out while the solidified casting with the mold material there around is still in the container. The finished article will be removed and any remaining sand washed away with water.

One manner in which the openings of the matrix may be selectively filled with casting and mold material is as follows. The motor 61 and 91 are energized to locate the tip 51A of funnel 51 above corner opening 29-1. The motor 91 then is energized to sweep the tip 51A from left to right as shown in FIG. 1 above the openings of row 105 until it is above the other corner opening of row 105. The motor 61 then is energized to move the tip 51A over the right most opening of the second row. Motor 91 next is energized to move the tip 51A from right to left over the opening of the second row until it reaches the left most opening of the second row. Motor 61 is actuated to move the tip 51A over the left most opening of the third row. Motor 91 is actuated to sweep the tip 51A over the openings of the third row, etc. In this manner, the tip 51A of the funnel 51 is swept over each row of openings of the matrix from row 105 to row 106. When the tip 51A is positioned over an opening of the matrix, the computer will actuate either source 115 or 117, depending on whether casting material or mold material is to be placed in the selected opening, to fill that opening with either casting or mold material. Thus as the tip 51A is passed over all of the openings of the matrix, selected ones of the openings which define the portion of the article in that layer will be filled with casting material and the other openings will be filled with mold material.

The method that is explained above has advantages since it allows the formation of intricate shapes without first building special molds for the shapes. The mold material can be dried and used again and highly variable shapes can be cast using the same matrix and container. Moreover the shapes can be formed with a digital computer controlled system.

One application for the digital casting process as described above includes the following. In medicine, using various techniques such as X-ray scanners and ultrasonic as well as heat scanners, data on body tissues can be obtained and stored on a computer readable medium such as magnetic tape or disc. This data can be analyzed and reduced to a form such that "cross-sectional" X-ray pictures of various body tissues can be created using television graphics display devices. By utilizing pseudo color arrangement, body tissue densities can be assigned color values in order to highlight various features such as bone, blood vessels, muscles, etc. Given the above described capability, exact three-dimensional models of internal body tissues can be identified and produced using the digital casting technique of the present invention. A heart surgeon, could for example, obtain a three-dimensional model (larger than life size, if desired) of a heart while the heart is still functioning within the patient's body. Depending upon the density resolution of the X-ray scanning device, it should be possible to obtain models of heart valves as healthy versus damaged heart tissue.

Since the digital casting method is so flexible, it would even be possible to produce model fracture lines to allow examination of internal features of the models. A "slice" line could be created in the model simply be directing the computer to leave out all matrix cell locations along the "slice" line plane. Mold material instead of casting material would be substituted in all of the cells which intersect the "slice" line plane.

Another application may be in the construction of models of intricate shapes such as found in mathematical analysis or aerospace. Computer generated graphics is already a well defined art. It would be relatively simple to transform the data needed to display a wing section of an aircraft, for example, to the data needed to actually make a model of the wing section by using the digital casting technique of the present invention.

Radar data could be used as input to a digital casting system to produce scale models of the earth (or any otherobject's) surface. Also construction projects such as bridges and dams could easily be created, visualized in three-dimensions and modified using digital casting techniques.

Although the preferred embodiment uses the automatic system of FIGS. 1 and 13 controlled by a computer for selectively filling the openings of the matrix with casting or mold material to form each layer, it is to be understood that the openings of the matrix could be selectively filled manually with casting material and mold material. After a layer of casting material and mold material is formed, a manually controlled mechanism may be employed to move the container downward relative to the matrix to form the next layer. When the article of dry casting material, held in place by the mold material, is formed as illustrated in FIG. 9, the process described with reference to FIGS. 10 and 11 will be carried out to obtain the article of FIG. 12.

In another embodiment, the casting material may be a powder made of some material that will melt or fuse at a given elevated temperature and the mold material may be a powder made of some material that has a higher melting or fusing temperature and will remain a powder at the given elevated temperature. The casting will be prepared as described above either automatically or manually to obtain the article of casting material in powder form held in place by the mold material in powder as shown in FIG. 9. Instead of adding water, the container with its mold-casting material will be placed in an oven and the container and its contents raised to a temperature sufficient to partially melt the casting material but insufficient to melt the mold material. The container and its contents then will be cooled and the still powder mold material shaken, blown, or washed off leaving the finished article.

Figure 14:
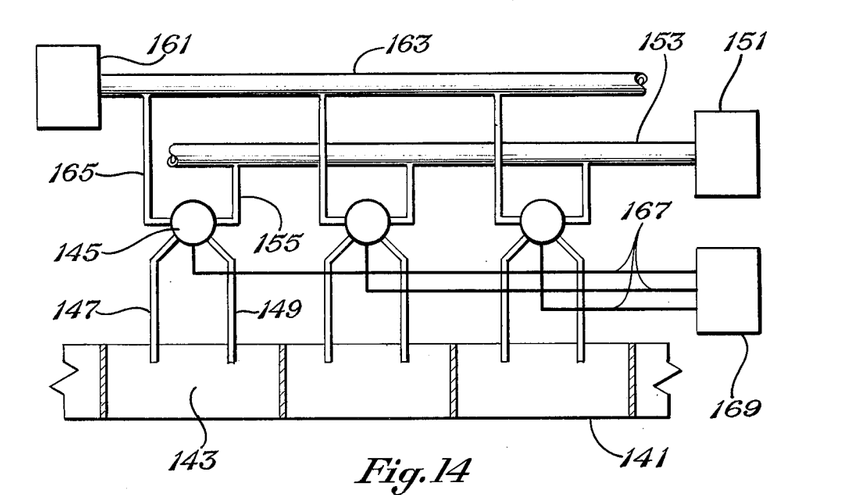
FIG. 14 illustrates a system for carrying out the process of another embodiment of the present invention.

In another embodiment, the matrix may be constructed to handle liquid mold and casting material. The mold material may be epoxy and the casting material may be an epoxy-hardener mixture. Referring to FIG. 14, the matrix is illustrated at 141. Each opening 143 has an associated valve 145 with a set of tubes 147 and 149 extending from the valve 145 into the opening. A source 151 of liquid epoxy is provided with a main feed tube 153 extending therefrom. Tubes 155 extend from main tube 153 to each valve 145. A source 161 of liquid hardener is provided with a main feed tube 163 extending therefrom. Tubes 165 extend from the main tube 163 to the valve 145. Each valve 145 is electrically controllable to allow epoxy and hardener to flow through tubes 149 and 147 respectively or to allow epoxy to flow through tube 149 with tube 147 closed off. Control of the valves is by way of lines 167 extending from a computer 169. In this embodiment, the container is held stationary and the matrix is supported to move in the container. In operation, the matrix will be placed in the container and withdrawn at a given speed. A constant flow of epoxy or epoxy-hardener mixture will be selectively injected into the openings of the matrix as it is withdrawn to form the article from the epoxy-hardener mixture essentially floating in epoxy. Selective injection of the epoxy or epoxy-hardener mixture into the openings of the matrix will be controlled by computer 169. The speed of withdrawal of the matrix will be such that the desired article will be formed in "layers". When the epoxy-hardener mixture sets, the article will be cleaned of the remaining epoxy to produce the desired three-dimensional article.

A continuous process for making articles utilizing the epoxy curing method also may be employed. In this process, a continuous laminar flow of epoxy will be maintained in a large tube or pipe. The continuous flow of epoxy will be introduced into a first end of the pipe or tube for flow toward the opposite end. The matrix 141 of FIG. 14 will be located in a stationery position in the pipe at the first end with its thin plane perpendicular to the axis of the pipe. The matrix will be located in a region in the central portion of the pipe away from the walls thereof. With the control system of FIG. 14, either epoxy or epoxy-hardener will be selectively injected into the openings of the matrix to form the desired article. The amount of the epoxy or epoxy-hardener mixture injected into the openings of the matrix will be metered to match the speed of the main epoxy flow whereby each article formed will move down stream away from the matrix with the main flow of epoxy where they will cure. When the articles are sufficiently curred to hold their shapes, the uncurred epoxy will be removed to make the articles accessible.

A liquid differential temperature method also may be employed to form the desired articles. The matrix and the system of FIG. 14 will be employed except that the sources 151 and 161 will be sources of two melted plastics here defined as plastics A and B. Source 151 will contain melted plastic B and source 161 will contain melted plastic A. One plastic will have a higher melting point than the other. For example, plastic A will have a melting point of 300° F. and plastic B will have a melting point of 200° F. Plastic A will be used to form the articles. Both plastics will have the same specific gravities so that one will not float in the other. Both plastics will be melted and maintained at the same temperature (for example, 310° F.) in sources 151 and 161. The system of FIG. 14 will be modified whereby tubes 149 will be eliminated and only tubes 147 will extend from the valves 145 into the openings 143 of the matrix 141. The valves 145 will be controllable by computer 169 to inject either melted plastic A or melted plastic B into the openings of the matrix by way of tubes 147. The modified matrix 141 of FIG. 14 will be located in a pipe at a first end and with its thin plane perpendicular to the axis of the pipe. The matrix will be located in the central region of the pipe away from the walls thereof.

Melted plastic B at 310° F. will be introduced into the first end of the pipe (from another source not shown) for laminar flow toward the other end. Melted plastic A or B will be selectively injected into the openings of the matrix to form the article of plastic A in the mold material of plastic B. The amount of plastic A or B injected into the openings of the matrix will be metered to match the main flow of plastic B introduced into the first end of the pipe whereby each article formed from plastic A will move downstream away from the matrix with the main flow of plastic B and harden in the still liquid plastic B. Before plastic B hardens, the articles formed will be removed and cleaned.

Figure 15:
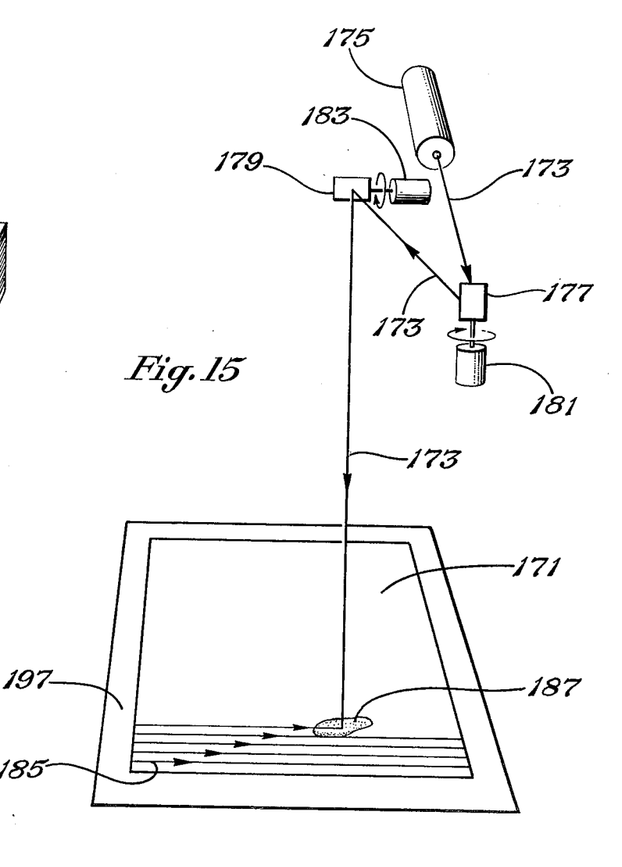
FIGS. 15-17 illustrate apparatus for carrying out the process of still another embodiment of the present invention.
Figure 16:
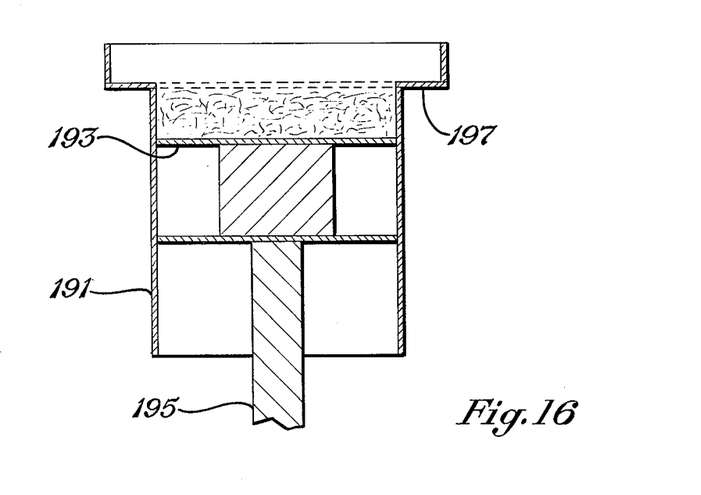
Figure 17:
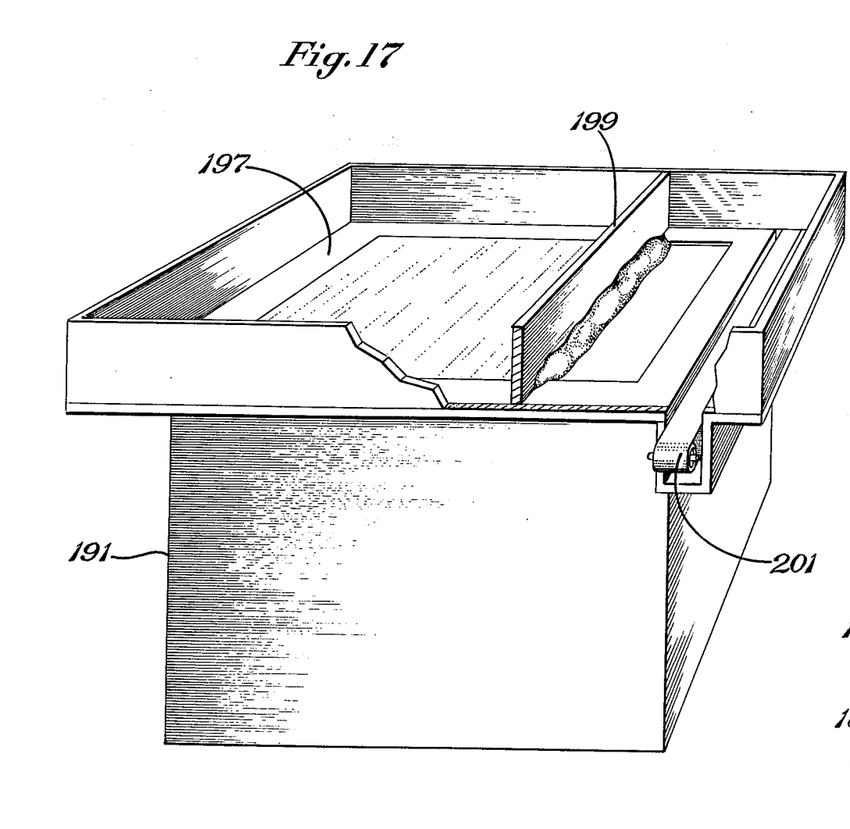

Referring now to FIGS. 15-17, there will be described another embodiment of the process of the present invention. In this embodiment, fusible particles are employed to form each layer which then is selectively fused by a laser beam to fuse an area in each layer which defines that portion of the article in the layers. The fusible particles may be of a suitable plastic or plastic-coated sand or small sand grains itself wherein a laser powerful enough to melt sand is employed. In FIG. 15, a layer to be selectively fused by a laser beam is illustrated at 171. The laser beam is depicted at 173. It is produced by a laser 175 and reflected from mirrors 177 and 179 onto the layer. Motors 181 and 183 rotate the mirrors 177 and 179 to cause the beam to scan the layer 171 in successive side-by-side scan lines illustrated at 185. The laser beam will be turned off when scanning that portion not to be fused and turned on when scanning that portion to be fused. In FIG. 15, that portion to be fused is illustrated at 187. The laser will be controlled by a computer or other system for selectively turning the laser on and off to selectively fuse adjacent lines in each layer. After one layer is selectively fused, another layer will be added to the top thereof and selectively fused whereby the article will be built in layers, the fused portion of one layer fusing onto a portion of the prior layer. After the article has been formed, the unfused particles will be removed by dusting, blowing, or washing thereby leaving the finished article. This process has advantages over the previously described processes in that only one type of material is required and no matrix is needed.

Referring to FIGS. 16 and 17, an apparatus is illustrated for forming each layer. The apparatus comprises a container 191 having a bottom 193 movable vertically by a rod 195 within the walls of the container. A tight seal will be provided between the edges of the bottom 193 and the inside walls of the container to prevent the particles from passing therebetween. An upper window 197 is provided having a thickness which defines the thickness of each layer. Initially, the bottom 193 will be located at the level of the lower edge of the window 197. A mound of fusible particles will be located in the window on the bottom 193 and then wiped by member 199 to a thin layer, level with the top of the window 197. Excess material is removed by a conveyor belt 201 for reuse. After the layer has been selectively fused by the laser beam, the bottom 193 is moved downward a distance corresponding with the thickness of the window 197 and a second layer of particles deposited on the first layer. The second layer is selectively fused by the laser beam and the process repeated until the solid article is formed in the container. The unfused particles are removed leaving the finished article.

Instead of using a laser to selectively fuse each layer, a separate mask for each layer and a heat source may be employed. In this embodiment, each mask will have an opening corresponding to the area of the layer to be fused. The mask will be placed over its associated layer and a heat source located above the mask. Heat passing through the opening of the mask will fuse together the particles exposed through the opening of the mask. The particles not exposed to the direct heat will not be fused. A second layer of particles will be spread over the first layer and its mask with the heat source employed to selectively fuse the second layer and the process repeated to build the article in layers. The fused portion of each layer will be fused onto a portion of the previous layer to build the solid article. After the solid article is formed in this manner, the unfused particles will be removed leaving the finished article. The apparatus of FIGS. 16 and 17 may be employed to form each successive layer.

In another embodiment, particles may be formed into sheets using material such as a water-soluble glue to hold the particles together while in a sheet form. Instead of forming each layer of loose particles, each layer will be formed of a sheet of the above described material. The mask-heat or laser beam process may be used to fuse the particles together to form a water "unsoluble" bond where the solid portion of the article is to be produced in each layer. After making an article, the water soluble portions may be washed away, thereby leaving the solid article in finished form. This embodiment has advantages of not requiring the layers to be located horizontally during the fusing step.

I claim:

1. A molding process for forming a three-dimensional article out of casting material comprising the steps of:
   (a) sequentially depositing the casting material and a mold material in unsolidified form in planar layers,
   (b) in a first layer depositing the casting material to fill an area which defines that portion of the article to be formed in that layer, (c) in said first layer, depositing the mold material next to said area such that the mold material holds the casting material in place, (d) in each adjacent layer repeating steps (b) and (c) until the article is formed from the casting material in unsolidified form held in place by the mold material, (e) solidifying the casting material, and (f) removing the mold material.

2. A molding process for forming a three-dimensional article out of casting material comprising the steps of:

(a) locating in a given position a matrix comprising a planar grid-like member having a plurality of openings formed therethrough, (b) depositing in selected ones of said openings a casting material to fill an area in a layer which defines that portion of the article to be formed in that layer, (c) depositing in other of said openings next to said area a mold material to fill the area in said layer not filled by the casting material, (d) separating said matrix and said layer, said mold material holding said casting material in place in said layer, (e) repeating steps (b), (c), and (d) sequentially in adjacent layers until the article is formed from the mold material held in place by the casting material, (f) solidifying the casting material, and (g) removing the mold material.

3. A molding process for forming a three-dimensional article out of a material capable of being solidified, comprising the steps of:

(a) sequentially depositing the material in planar layers, (b) in a first layer depositing the material over an area greater than the area of the article to be formed in that layer, (c) in said first layer solidifying the casting material over an area which defines that portion of the article to be formed in that layer leaving the material in the remaining area of that layer unaffected, (d) in each adjacent layer repeating steps (b) and (c) until the article is formed from the material in solidified form, and (e) removing the unaffected material from around said article.

* * * * *

REEXAMINATION CERTIFICATE (3008th)
United States Patent [19]
Housholder

[11] B1 4,247,508
[45] Certificate Issued Oct. 1, 1996

[54] MOLDING PROCESS

[75] Inventor: Ross F. Housholder, Arlington, Tex.

[73] Assignee: DTM Corporation, Austin, Tex.

Reexamination Request:
No. 90/003,698, Jan. 23, 1995

Reexamination Certificate for:
Patent No.: 4,247,508
Issued: Jan. 27, 1981
Appl. No.: 99,333
Filed: Dec. 3, 1979

[51] Int. Cl.$^6$ .................. B29C 33/00; B29C 35/08
[52] U.S. Cl. .............. 264/219; 264/122; 264/221; 264/308; 264/317; 264/497
[58] Field of Search .............. 264/22, 25, 113, 264/125, 221, 236, 308, 317, 401, 497; 156/58, 59, 62.2, 155, 242, 272.8, 273.3, 273.5, 275.5, 307.1; 427/508, 510, 512, 553, 554, 555, 557, 559; 364/468, 476

[56] References Cited

U.S. PATENT DOCUMENTS

| | | | |
|---|---|---|---|
| 473,901 | 5/1892 | Blanther | 434/152 |
| 774,549 | 11/1904 | Baese | 430/320 |
| 1,516,199 | 11/1924 | Monteath | 430/320 |
| 2,015,457 | 9/1935 | Morioka | 156/58 |
| 2,076,952 | 4/1937 | Kratky | 419/6 |
| 2,189,592 | 2/1940 | Perera | 434/152 |
| 2,350,796 | 6/1944 | Morioka | 156/58 |
| 2,435,273 | 2/1948 | Hatfield | 427/596 |
| 2,775,758 | 12/1956 | Munz | 342/179 |
| 3,137,080 | 6/1964 | Zang | 434/152 |
| 3,428,503 | 2/1969 | Beckerle | 430/269 |
| 3,751,827 | 8/1973 | Gaskin | 434/152 |
| 3,848,104 | 11/1974 | Locke | 219/121.65 |
| 3,932,923 | 1/1976 | DiMatteo | 29/407 |
| 3,985,995 | 10/1976 | Brandi | 219/76.12 |
| 3,988,520 | 10/1976 | Riddle | 428/15 |
| 4,041,476 | 8/1977 | Swainson | 365/119 |
| 4,117,302 | 9/1978 | Earle et al. | 219/121.64 |
| 4,135,902 | 1/1979 | Oehrle | 65/392 |
| 4,270,675 | 6/1981 | Wicks et al. | 222/196 |
| 4,323,756 | 4/1982 | Brown et al. | 219/121.66 |

FOREIGN PATENT DOCUMENTS

| | | |
|---|---|---|
| 2263777 | 7/1973 | Germany . |
| 137951 | 10/1979 | Germany . |
| 51-10813 | 4/1976 | Japan . |
| 1215184 | 12/1970 | United Kingdom . |

OTHER PUBLICATIONS

Bogart, "In art the ends just don't always justify means", *Smithsonian*, vol. 10, pp. 104–110 (1979).

*Primary Examiner*—Leo B. Tentoni

[57] ABSTRACT

A molding process for forming a three-dimensional article in layers. In one embodiment, a matrix comprising a planar grid-like member having a plurality of openings formed therethrough is employed. In an initial layer, casting material and mold material are deposited in selected openings to form a portion of the article in that layer with the casting material surrounded by the mold material. The matrix is located sequentially in adjacent layers and in each layer, the selective deposition of casting and mold material is repeated whereby the article is formed layer by layer from the casting material held in place by the mold material. The casting material is solidified and the mold material is removed.

In another embodiment, planar layers of material are sequentially deposited. In each layer, prior to the deposition of the next layer, a portion of its area is solidified to define that portion of the article in that layer. Selective solidification of each layer may be accomplished by using heat and a selected mask or by using a controlled heat scanning process.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 2 is confirmed.

Claim 3 is determined to be patentable as amended.

New claims 4–23 are added and determined to be patentable.

3. A molding process for forming a three-dimensional article out of a material capable of being solidified, comprising the steps of:
(a) sequentially depositing the material in planar layers,
(b) in a first layer depositing the material over an area greater than the area of the article to be formed in that layer,
(c) in said first layer solidifying the [casting] material over an area which defines that portion of the article to be formed in that layer leaving the material in the remaining area of that layer unaffected, *wherein the solidifying step comprises directing a laser beam to the material within the area which defines that portion of the article to be formed in that layer,*
(d) in each adjacent layer repeating steps (b) and (c), wherein the repeated solidifying step fuses a portion of the article in each layer to a portion of the article formed in a prior layer, until the article is formed from the material in solidified form, and
(e) removing the unaffected material from around said article.

4. *The method of claim 3 wherein the directing step comprises directing the laser beam in successive side-by-side scan lines.*

5. *The method of claim 3 wherein the directing step directs the laser beam by reflection from at least one mirror.*

6. *The method of claim 3 wherein the directing step comprises, for each of the layers, turning on the laser beam with a computer so as to scan that portion of the article to be formed in the layer.*

7. *The method of claim 3, wherein the directing step comprises, for each of the layers:*
*directing the laser beam in successive side-by-side scan lines by reflection from at least one mirror; and*
*turning on the laser beam with a computer so as to scan that portion of the article to be formed in that layer.*

8. *A molding process for forming a three-dimensional article out of a material capable of being solidified, comprising the steps of:*
*(a) sequentially depositing the material in planar layers,*
*(b) in a first layer depositing the material over an area greater than the area of the article to be formed in that layer,*
*(c) in said first layer solidifying the material over an area which defines that portion of the article to be formed in that layer leaving the material in the remaining area of that layer unaffected, wherein the solidifying step comprises:*
*applying a mask over said first layer of material, the mask having an opening corresponding to the area of said first layer which defines that portion of the article to be formed in said first layer; and*
*exposing said first layer of material to a heat source through the mask,*
*(d) in each adjacent layer repeating steps (b) and (c), wherein the repeated solidifying step fuses a portion of the article in each layer to a portion of the article formed in a prior layer, until the article is formed from the material in solidified form, and*
*(e) removing the unaffected material from around said article.*

9. *The method of claim 3 wherein the material comprises a powder of fusible particles.*

10. *A molding process for forming a three-dimensional article out of a material capable of being solidified, comprising the steps of:*
*(a) sequentially depositing the material in planar layers,*
*(b) in a first layer depositing the material over an area greater than the area of the article to be formed in that layer,*
*(c) in said first layer solidifying the material over an area which defines that portion of the article to be formed in that layer leaving the material in the remaining area of that layer unaffected,*
*(d) in each adjacent layer repeating steps (b) and (c), wherein the repeated solidifying step fuses a portion of the article in each layer to a portion of the article formed in a prior layer, until the article is formed from the material in solidified form, and*
*(e) removing the unaffected material from around said article,*
*wherein the depositing steps each comprise defining a layer of material within a walled container above a vertically movable platform within the container.*

11. *The method of claim 10 wherein the vertically moveable platform comprises the bottom of the container.*

12. *The method of claim 10 wherein the vertically moveable platform supports the three-dimensional article as it is being formed.*

13. *The method of claim 10 wherein said defining step comprises:*
*locating a volume of the material at an upper surface of the container; and*
*advancing a wiper member across the material to define the layer of the material.*

14. *The method of claim 10 wherein the material comprises a powder of fusible particles;*
*and wherein the solidifying step comprises binding particles of the powder to one another over an area which defines that portion of the article to be formed.*

15. *The method of claim 14 wherein the binding step comprises, for each of the layers, applying energy to the fusible particles in a selected portion of the layer.*

16. *The method of claim 15 wherein the applying step comprises directing a laser beam to the material.*

17. *A molding process for forming a three-dimensional article out of a material capable of being solidified, wherein the material comprises a plastic powder, the process comprising the steps of:*

(a) sequentially depositing the material in planar layers, (b) in a first layer depositing the material over an area greater than the area of the article to be formed in that layer, (c) in said first layer solidifying the material over an area which defines that portion of the article to be formed in that layer leaving the material in the remaining area of that layer unaffected, (d) in each adjacent layer repeating step (b) and (c), wherein the repeated solidifying step fuses a portion of the article in each layer to a portion of the article formed in a prior layer, until the article is formed from the material in solidified form, and (e) removing the unaffected material from around said article.

18. The method of claim 3 wherein the material comprises a powder of a first material coated with a second material, wherein the second material has a lower melting temperature than the first material.

19. The method of claim 3 wherein the material comprises sand.

20. A molding process for forming a three-dimensional article out of a material capable of being solidified, comprising the steps of:

(a) sequentially depositing the material in planar layers, (b) in a first layer depositing the material over an area greater than the area of the article to be formed in that layer, (c) in said first layer solidfying the material over an area which defines that portion of the article to be formed in that layer leaving the material in the remaining area of that layer unaffected, (d) in each adjacent layer repeating steps (b) and (c), wherein the repeated solidifying step fuses a portion of the article in each layer to a portion of the article formed in a prior layer, until the article is formed from the material in solidified form, and (e) removing the unaffected material from around said article, wherein the depositing steps each comprise:

supporting the material within a walled container above a vertically moveable platform therewithin; and before each repeated solidifying step, lowering the vertically moveable platform.

21. The method of claim 20, further comprising, after each lowering step, advancing a wiper member across the material.

22. The method of claim 3 wherein the removing step is performed after the repeated depositing and solidifying steps.

23. The method of claim 3, wherein the material comprises a plurality of sheets of powder particles bound to one another therewithin;

and wherein the repeated depositing steps each comprise: placing one of the plurality of sheets over a previously deposited layer.

* * * * *